United States Patent
Ling

(10) Patent No.: US 8,608,252 B2
(45) Date of Patent: Dec. 17, 2013

(54) SPOKE OF A BICYCLE WHEEL

(76) Inventor: Yi-Chuan Ling, Taipei (TW)

( * ) Notice: Subject to any disclaimer, the term of this patent is extended or adjusted under 35 U.S.C. 154(b) by 557 days.

(21) Appl. No.: 12/978,610

(22) Filed: Dec. 26, 2010

(65) Prior Publication Data

US 2012/0161499 A1 Jun. 28, 2012

(51) Int. Cl.
    *B60B 1/04* (2006.01)
(52) U.S. Cl.
    USPC .......................................... 301/104; 411/412
(58) Field of Classification Search
    USPC ........ 301/55–58, 61, 104; 411/411–413, 415, 411/424
    See application file for complete search history.

(56) References Cited

U.S. PATENT DOCUMENTS

| | | | | |
|---|---|---|---|---|
| 600,176 | A * | 3/1898 | Roth | 301/104 |
| 1,660,319 | A * | 2/1928 | Ash | 301/104 |
| 3,381,733 | A * | 5/1968 | Stanwick | 411/311 |
| 4,346,920 | A * | 8/1982 | Dailey | 285/89 |
| 5,795,120 | A * | 8/1998 | Hurdle | 411/386 |
| 6,685,411 | B2 * | 2/2004 | Kato | 411/386 |
| 6,736,576 | B2 * | 5/2004 | Suzuki et al. | 411/307 |
| 6,811,228 | B2 * | 11/2004 | Tien | 301/58 |
| 7,140,694 | B2 * | 11/2006 | Mason | 301/37.41 |
| 7,357,460 | B2 * | 4/2008 | Schlanger | 301/104 |
| 8,215,720 | B2 * | 7/2012 | Mercat et al. | 301/75 |
| 8,246,119 | B2 * | 8/2012 | Schlanger | 301/57 |
| 8,251,459 | B2 * | 8/2012 | Mason | 301/58 |
| 2004/0155518 | A1 * | 8/2004 | Schlanger | 301/58 |
| 2009/0050276 | A1 * | 2/2009 | Lacombe | 157/3 |
| 2012/0161499 | A1 * | 6/2012 | Ling | 301/104 |
| 2013/0043714 | A1 * | 2/2013 | Schlanger | 301/58 |

* cited by examiner

*Primary Examiner* — Glenn Dayoan
*Assistant Examiner* — Gregory Blankenship
(74) *Attorney, Agent, or Firm* — Pai Patent & Trademark Law Firm; Chao-Chang David Pai

(57) ABSTRACT

A spoke of a bicycle rim has a spoke body having a connecting end and a threaded segment formed on the connecting end. The threaded segment has multiple first thread sections and at least one second thread section. The first thread sections have a major radius, a minor radius and a pitch. The at least one second thread section is formed between the first thread sections to form at least one loosen-proofing section between the first thread sections and has a major radius, a minor radius and a pitch. The major radius of the second thread section is smaller than the major radius of the first thread sections. The minor radius of the second thread section is larger than the minor radius of the first thread sections. The pitch of the second thread section is the same as that of the first thread sections.

4 Claims, 3 Drawing Sheets

SPOKE OF A BICYCLE WHEEL

BACKGROUND OF THE INVENTION

1. Field of the Invention

The present invention relates to a spoke, and more particularly to a spoke of a bicycle wheel to enhance the combination between a nut and a threaded segment of the spoke to prevent the nut from loosening from the threaded segment.

2. Description of Related Art

A wheel of a bicycle substantially comprises a rim, a hub and multiple spokes. Each spoke has a mounting end connected securely with the hub and a connecting end. The connecting end is threaded and is connected securely with the rim with a nut. Accordingly, the spokes can provide an excellent supporting effect to the rim and transmits driving power from the hub to the rim to make the wheel rotating and driving the bicycle to move. To keep the safety of riding the bicycle, the wheel has to be an excellent circular condition. However, the nuts of the conventional spokes on a bicycle wheel will be loosened from the treaded connecting ends of the spokes to cause the wheel not kept at the excellent circular condition due to the shock or vibration generated during the riding of the bicycle. Accordingly, the stabilization and safety of riding the bicycle will be badly influenced.

With reference to FIG. 5, a conventional spoke 30 having a loosen-proofing effect comprises a spoke body 31, a mounting head 32 connected with a hub and a threaded segment 33. The threaded segment 33 is connected with a rim with a nut and has a non-threaded buffering section 34 formed between two thread sections including a first thread section and a second thread section adjacent to the spoke body 31. The second thread section has a length longer than that of the first thread section and has a pitch different from that of the first thread section. When the nut is screwed onto and engages the thread sections of the threaded segment 33 of the spoke 30, the non-threaded buffering section 34 will be expanded, shortened or twisted due to the difference between the pitches of the thread sections. Therefore, the threaded segment 33 of the spoke 30 will be deformed due to the elastic stress and torque caused by the deformation of the buffering section 34. The deformation of the threaded segment 33 will make the secure combination between the threaded segment 33 and the nut to provide a loosen-proofing effect, but this also easily cause break or damage to the buffering section 34 due to the stress and torque. When the buffering section 34 is broken or damaged, a new spoke is needed to replace a damaged one, and this is uneconomic and not environment friendly.

To overcome the shortcomings, the present invention tends to provide a spoke to mitigate or obviate the aforementioned problems.

SUMMARY OF THE INVENTION

The main objective of the invention is to provide a spoke of a bicycle wheel to provide a loosen-proofing effect to keep a nut from loosening from a threaded segment of the spoke and to prolong the life span of the spoke.

The spoke has a spoke body having a connecting end and a threaded segment formed on the connecting end. The threaded segment has multiple first thread sections and at least one second thread section. The first thread sections have a major radius, a minor radius and a pitch. The at least one second thread section is formed between the first thread sections to form at least one loosen-proofing section between the first thread sections and has a major radius, a minor radius and a pitch. The major radius of the second thread section is smaller than the major radius of the first thread sections. The minor radius of the second thread section is larger than the minor radius of the first thread sections. The pitch of the second thread section is the same as that of the first thread sections.

Other objects, advantages and novel features of the invention will become more apparent from the following detailed description when taken in conjunction with the accompanying drawings.

DETAILED DESCRIPTION OF PREFERRED EMBODIMENT

Figure 1:
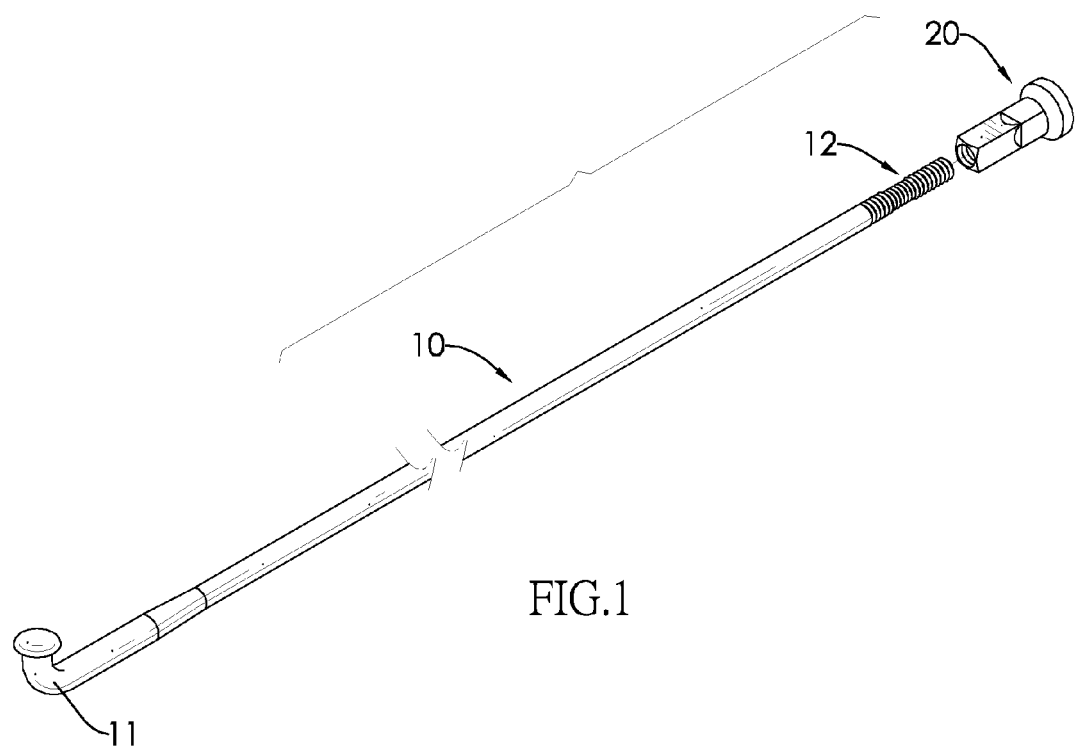
FIG. 1 is an exploded perspective view of a spoke of a bicycle wheel in accordance with the present invention.

With reference to FIG. 1, a spoke of a bicycle wheel in accordance with the present invention comprises a spoke body 10 and a threaded segment 12. The spoke body 10 has a connecting end and a mounting end 11 opposite to the connecting end and connected securely with a hub.

Figure 2:
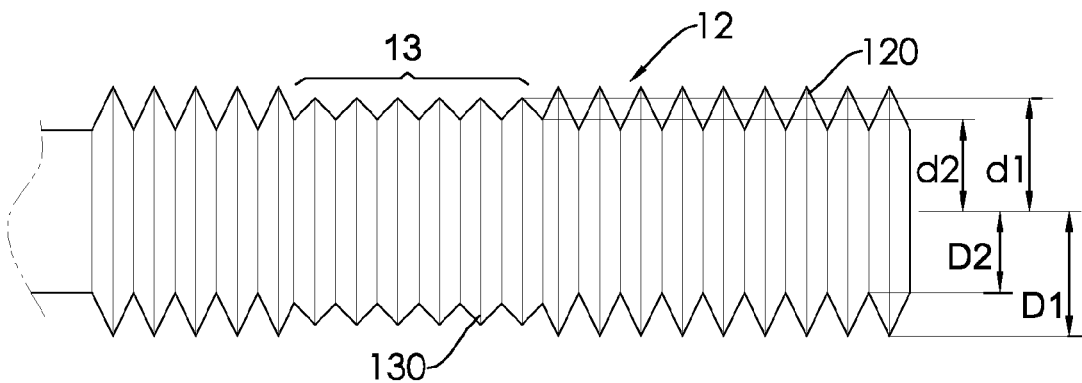
FIG. 2 is an enlarged side view of the spoke in FIG. 1.

With further reference to FIG. 2, the threaded segment 12 is formed on the connecting end and has multiple first thread sections 120 and at least one second thread section 130. The at least one second thread section 130 is formed between the first thread sections 120 to form at least one loosen-proofing section 13 between the first thread sections 120. In the preferred embodiment, two first thread sections 120 and one second thread section 130 are implemented.

The first thread sections 120 have a major radius D1, a minor radius D2 and a pitch. Wherein, the major radius D1 of the first thread section 120 is defined as a radial distance between the axial line and a peak of the thread of the first thread section 120, and the minor radius D2 of the first thread section 120 is defined as a radial distance between the axial line and a valley of the thread of the first thread section 120. The at least one second thread section 130 has a major radius d1, a minor radius d2 and a pitch. Wherein, the major radius d1 of the second thread section 130 is defined as a radial distance between the axial line and a peak of the thread of the second thread section 130, and the minor radius d2 of the second thread section 130 is defined as a radial distance between the axial line and a valley of the thread of the second thread section 130. The major radius d1 of the second thread section 130 is smaller than the major radius D1 of the first thread sections 120, but the minor radius d2 of the second thread section 130 is larger than the minor radius D2 of the first thread sections 120. The pitch of the second thread section 130 is the same as that of the first thread sections 120. In addition, each first thread section 120 has multiple threads, and the adjacent two of the first thread sections 120 between which a corresponding section thread section 130 is formed have different numbers of threads.

Figure 3:
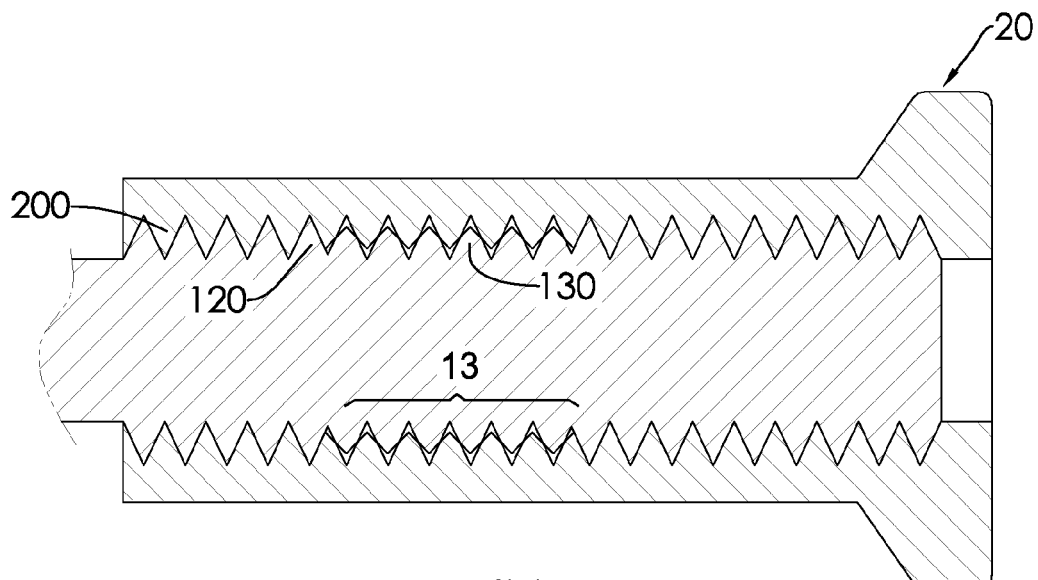
FIG. 3 is an enlarged cross sectional side view of the spoke in FIG. 1.
Figure 4:
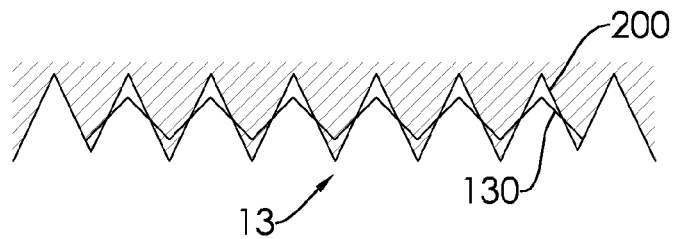
FIG. 4 is an enlarged side view in partial section of the spoke in FIG. 3 showing the engagement between the threaded segment and the nut of the spoke.
Figure 5:
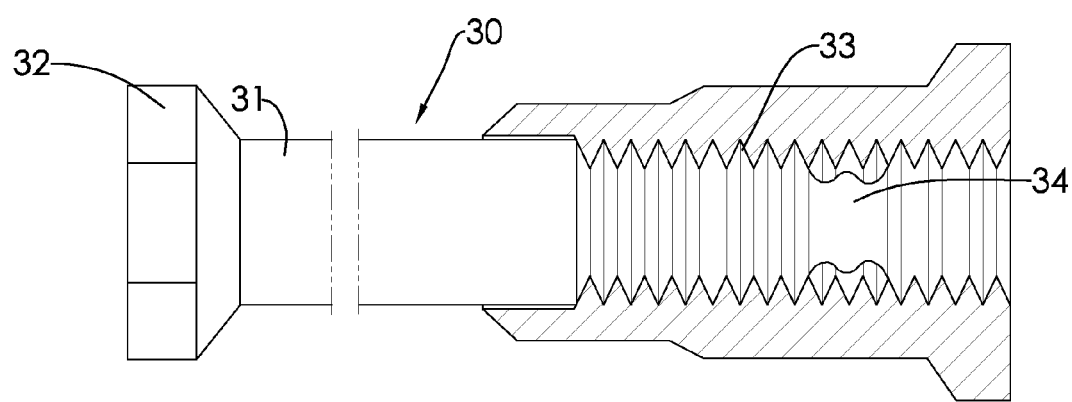
FIG. 5 is a side view in partial section of a conventional spoke in accordance with the prior art.

With further reference to FIGS. 3 and 4, the connecting end of the spoke body 10 is connected securely to a rim with a nut 20. The nut 20 has an inner thread 200 having a major radius and a minor radius corresponding to and matching with that of the first thread sections 120. When the nut 20 is screwed onto the threaded segment 12 of the spoke, the nut 20 is firstly screwed with the first thread section 120 at the end of the spoke smoothly because the radii of the inner thread 200 and the first thread section 120 match with each other. The nut 20 is then screwed with the second thread section 130, and peaks of the threads of the inner thread 200 of the nut 20 will securely engage the valleys of the threads of the second thread section 130 due to the minor radius d2 of the second thread section 130 is smaller than that of the first thread sections 120. Although the smaller minor radius d2 of the second thread section 130 will cause a little rough rotation of the nut 20, the nut 20 can be still rotated over the second thread section 130 with a litter larger rotating force due to the pitch of the second thread section 130 is the same as that of the first thread sections 120 and the inner thread 200 of the nut 20 enables to screw with the adjacent thread first section 120. Accordingly, the nut 20 can be securely screwed with the threaded segment 12 of the spoke, and an excellent loosen-proofing effect is provided. With such an arrangement, the structure of the threaded segment 12 is not damaged or broken after screwed with the nut 20, and the life span of the spoke can be efficiently prolonged. In addition, the circular condition of a wheel rim can be truly achieved by adjusting the engagement positions between the nuts 20 and the threaded segments 12 of the spokes.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A spoke of a bicycle wheel comprising:
    a spoke body having a connecting end;
    a threaded segment formed on the connecting end and having
        multiple first thread sections having a major radius, a minor radius and a pitch;
        at least one second thread section formed between the first thread sections to form at least one loosen-proofing section between the first thread sections and having
            a major radius smaller than the major radius of the first thread sections;
            a minor radius larger than the minor radius of the first thread sections; and
            a pitch same as that of the first thread sections.

2. The spoke as claimed in claim 1, wherein each first thread section has multiple threads; and
    the adjacent two of the first thread sections between which a corresponding section thread section is formed have different numbers of threads.

3. The spoke as claimed in claim 2, wherein the spoke body further has a mounting end opposite to the connecting end.

4. The spoke as claimed in claim 1, wherein the spoke body further has a mounting end opposite to the connecting end.

* * * * *